Figure 3:
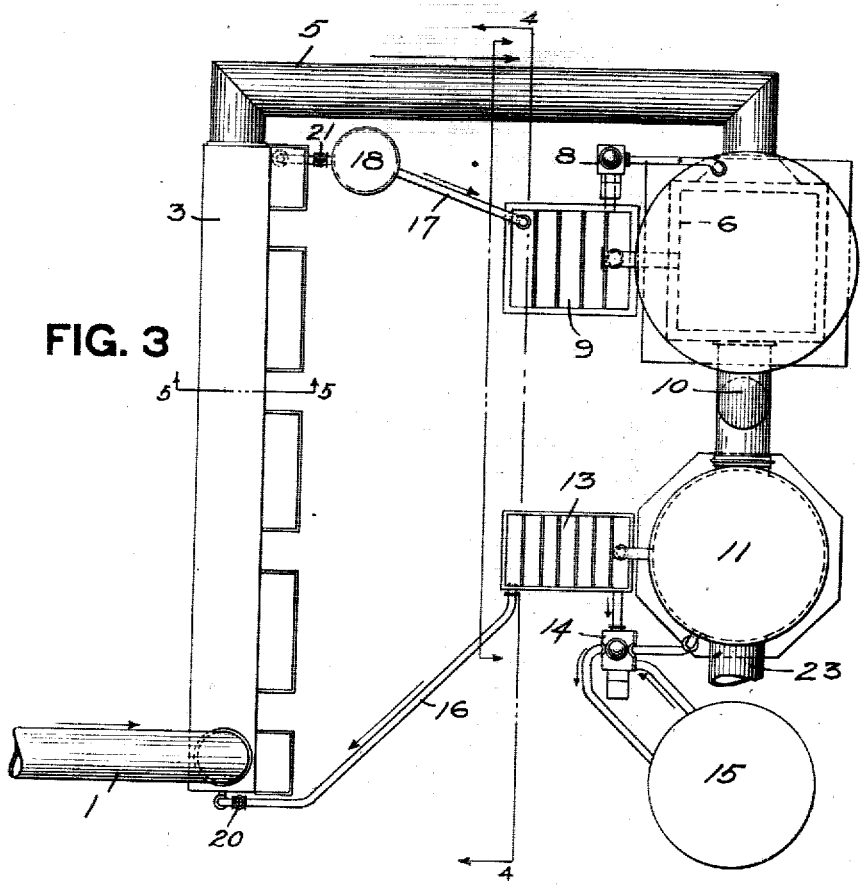

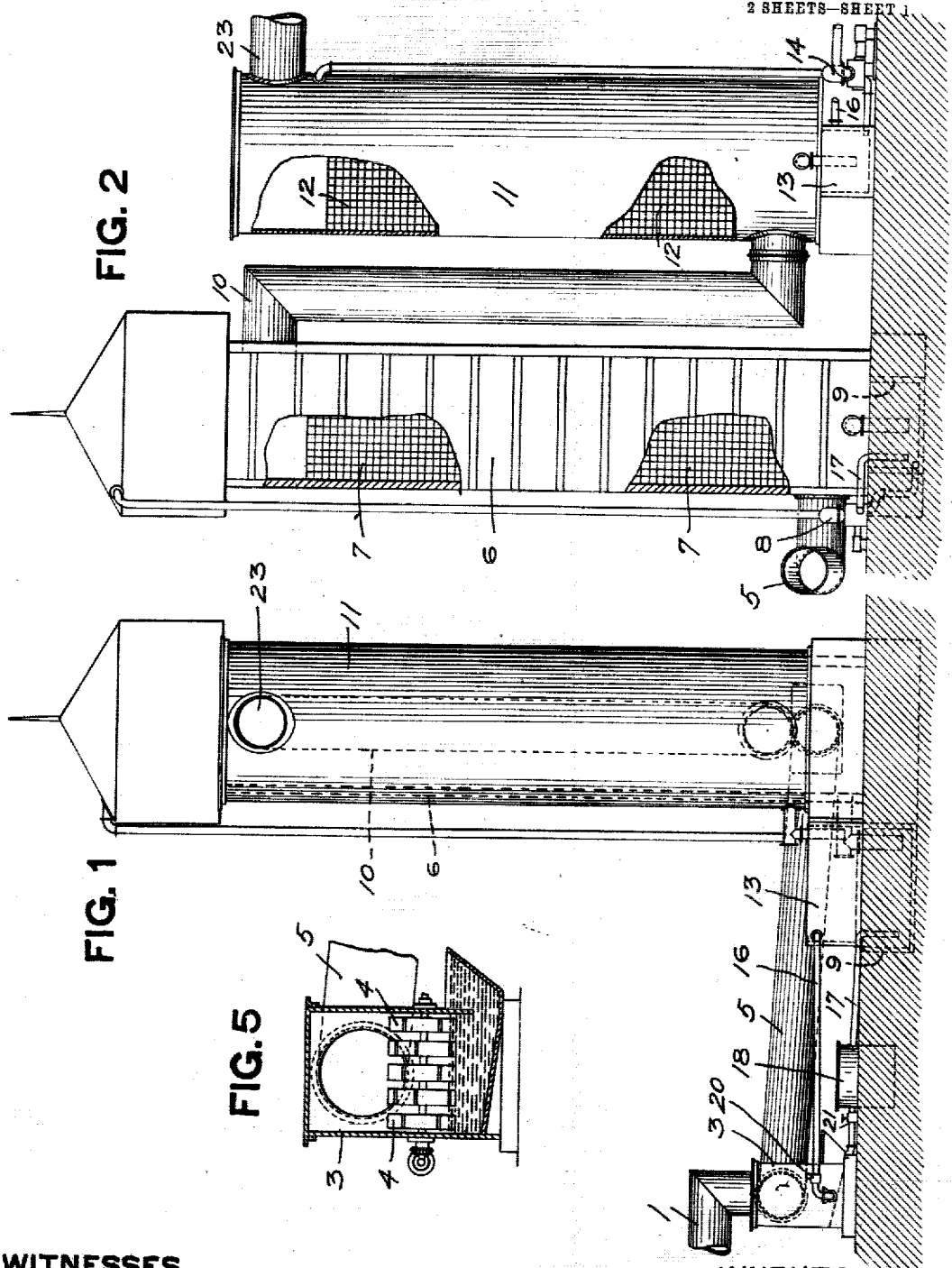

No. 820,039. PATENTED MAY 8, 1906.
E. J. DUFF.
PROCESS OF RECOVERING AMMONIA FROM GAS.
APPLICATION FILED FEB. 10, 1905.

2 SHEETS—SHEET 2

WITNESSES. INVENTOR.

UNITED STATES PATENT OFFICE.

EDWARD JAMES DUFF, OF LIVERPOOL, ENGLAND.

PROCESS OF RECOVERING AMMONIA FROM GAS.

No. 820,039.　　　　Specification of Letters Patent.　　　　Patented May 8, 1906.

Application filed February 10, 1905. Serial No. 245,116.

*To all whom it may concern:*

Be it known that I, EDWARD JAMES DUFF, a resident of Liverpool, in the county of Lancaster, England, have invented a new and useful Improvement in Processes of Recovering Ammonia from Gas; and I do hereby declare the following to be a full, clear, and exact description thereof.

My invention relates to a process for cleaning and cooling artificial gases, and more especially for the recovery of the by-products, such as ammonia, therefrom.

The object of my invention is to increase the percentage of ammonia which is recovered from the gas and also to provide for a saving in the amount of water used.

The invention is intended for the treatment of fuel-gases, and particularly producer-gases—that is, those which are produced from bituminous coal by gasifying practically the whole of the carbonaceous substances contained in the coal. Heretofore such producer-gases have been scrubbed or washed and then subjected to the action of an ammonia-absorbing liquor, such as a weak solution of sulfate of ammonia containing an excess of sulfuric acid, and then again subjected to a washing or cooling operation. The absorbing liquor removed from the gas the major portion of the ammonia-gas. A portion of ammonia, however, is absorbed by the water during the first washing or scrubbing step and also in the final washing and cooling step. Heretofore the ammonia absorbed by the water in both of these steps has been lost. Furthermore, the gas as it comes from the producer is very hot, so that it evaporates a considerable amount of the water in the first washer. Heretofore this vapor has been lost and fresh water has had to be supplied by pumps or otherwise to make up the deficiency.

The primary object of my invention is to increase the yield of ammonia recovered from fuel-gases, and particularly from producer-gas.

A further object of the invention is to continually return a portion of the water condensed from the gas in the cooler to the washer for further use.

To these ends the invention consists, generally stated, in subjecting the gases to washing and cooling operations, as heretofore, and subjecting the water used for such washing and cooling operations to the action of an ammonia-absorbing agent or liquor to recover from such water the ammonia which has been absorbed thereby.

More particularly, the invention consists in passing the gases in succession through a scrubber, thence through or over an absorbing agent or liquor, and thence through a cooler, and continuously withdrawing a portion of the condensed water from the cooler to replace that absorbed by the gas in the washer and continuously or from time to time allowing a portion of the water containing absorbed ammonia to flow from the scrubber and mingle with the ammonia-absorbing liquor (containing excess of sulfuric acid) being circulated in the ammonia-absorbing tower.

Figure 4:
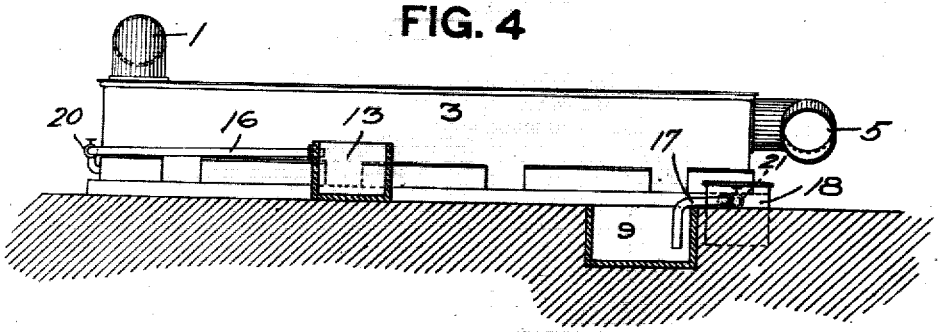

In the accompanying drawings, Figure 1 is an elevation of apparatus suitable for carrying out my process. Fig. 2 is a view, partly in elevation and partly in vertical section, being taken at right angles to Fig. 1. Fig. 3 is a plan of the apparatus. Fig. 4 is a section on the line 4 4, Fig. 3; and Fig. 5 is a section on the line 5 5, Fig. 3.

In the apparatus illustrated the hot gas from the producer enters through a pipe 1 into the scrubber or washer 2. This may be of any known or desired type, that shown in the drawings being constructed as a horizontal substantially rectangular box or flue partly filled with water which is thrown up by any suitable mechanical means, such as the paddles 4, into a spray or shower, entirely filling the chamber. This spray or shower of water may, however, be obtained by any other suitable means, such as by a gravity-spray, from the top or roof of the chamber. The purpose of this washer is to remove from the gas impurities—such as dust, soot, and tar—and at the same time to reduce the temperature of the gas. Incidentally in this process some of the ammonia is absorbed by the water, also some of the water is evaporated by the hot gas. My invention is particularly applied to the subsequent recovery of the ammonia absorbed by this water and the return of the condensed water to the scrubber.

The hot gas coming from the producer passes through the spray or shower of water in the scrubber and out at the opposite end and thence through a pipe 5 to the base of the ammonia-absorbing tower 6. When the gas enters this tower, it still retains the bulk of ammonia-gas originally contained therein. To remove this, the tower 6 is filled with perforated brickwork 7 or other equivalent means, over which a spray or shower of ammonia-absorbing liquor is kept in continual circulation. This liquor may be of any suitable nature capable of absorbing the ammonia, such as a weak solution of sulfate of ammonia containing a slight excess of sulfuric acid. This liquor is continually circulated, being raised, by means of a pump 8 or other suitable means, from a receiving-tank 9 at the base of the tower to the top thereof. The gas passes upwardly through the perforated brickwork and through the spray or shower of absorbing liquor flowing over the same, and said liquor absorbs the ammonia in the usual and well-understood manner.

The purified gas escapes at the top of the tower and is conveyed by the pipe 10 to suitable gas-cooling apparatus, such as the tower 11, which may be of any suitable construction, that shown being filled with perforated brickwork 12 or the like and over which is continuously circulated a stream or shower of cold water for the purpose of cooling and further washing the gas. This water is kept in continuous circulation, being returned from the collecting-chamber 13 at the base of the tower to the top thereof by means of a pump 14 or other suitable means. The shower falls downwardly through the tower, while the gas passes upwardly therethrough. The gas is still quite warm, so that the water becomes heated, and hence before being returned to the top of the tower is passed through any suitable cooling apparatus, which is diagrammatically indicated at 15.

The gas after leaving the absorbing-tower 6 still contains traces of ammonia, and this is partly or mostly absorbed by the cooling-water in the tower 11. To recover the ammonia from this water, as well as to recover the ammonia absorbed by the water in the scrubber 2, I subject both of said waters to the action of a suitable absorbing agent, this preferably being the liquor circulating through the tower 6. This can be conveniently accomplished by returning the excess of water from the receiving-tank 13 to the scrubber 2—as, for instance, through the pipe 16—and returning the excess of water from the washer 2 to the receiving-tank 9 through a suitable pipe 17. Before passing into the tank 9 the water passes through a settling-reservoir 18, in which the tar, dust, soot, and other impurities are to a large extent removed from the water.

The apparatus is so arranged that the flow of water from the receiving-tank 13 at the base of the cooling-tower to the tank 9 at the base of the ammonia-absorbing tower is entirely by gravity. The rate of this flow to and from the washer 2 can be controlled by any suitable valves, such as shown at 20 and 21. In the receiving-tank 9 a portion of the water which has been used both for cooling and scrubbing the gas is mingled with the ammonia-absorbing agent, and therefore all or nearly all the ammonia contained in the scrubbing and cooling water is recovered. By this means I recover eight to ten per cent. of ammonia in addition to that heretofore recovered.

The water which is evaporated by the hot gas in the scrubber 2 passes as steam-vapor into the cooling-tower, where it is condensed and passes down into the reservoir 13, and it is practically this water which forms the excess that is returned from the tank 13 to the washer 2. Usually producer-gas contains a considerable amount of moisture, which is condensed in its passage through the apparatus, so that an excess of water is generally present, and consequently water need not be added. If necessary, however, from time to time additional water may be admitted at any convenient point in the system, preferably into the cooling-water.

In the use of the apparatus described the gas from the producer passes in succession through the scrubber 2, the absorbing-tower 6, and the cooler 11, and thence out through the pipe 23 from the top of the cooling-tower. In its passage through the scrubber it is freed from dust, soot, and tar, and a certain amount of ammonia is also absorbed by the scrubbing-water. It also evaporates a portion of this water. In its passage through the absorbing-tower it comes in contact with the solution of sulfate of ammonia containing an excess of sulfuric acid, which absorbs the bulk of the ammonia remaining in the gas. In its passage through the cooling-tower the most of the remaining traces of ammonia is absorbed by the cooling-water and any moisture originally contained in the producers, along with the moisture and which has been added by the evaporation of water in the scrubber, is condensed and passes with the cooling-water into the receiving-tank 13. This excess of water containing traces of ammonia, or a portion of it, is returned by the pipe 16 to the scrubber. In the scrubber the water takes on more ammonia and thence passes, first, through the settling-tank 18, and thence to the receiving-tank 9, where it is mingled with the circulating liquor of the tower 6, which liquor contains an excess of sulfuric acid, and hence absorbs the ammonia contained in the water, thus increasing the amount of ammonia in the liquor of the ammonia-absorbing tower.

By means of the process described a considerable amount of ammonia is recovered which has heretofore been lost; also, the water evaporated in the washer 2 and subsequently condensed in the cooler 11 is returned to the washer along with any ammonia escaping from the absorbing-tower 6. This water with its contained ammonia, as well as the ammonia absorbed in the washer, are delivered to the ammonia-absorber 6 and recovered.

Various forms and arrangements of apparatus other than those shown in the drawings may be used for carrying out the process.

What I claim is—

1. The process of recovering ammonia from coal or fuel gas, which consists in passing the gas through or in contact with water to scrub the same, then passing the same through and in contact with ammonia-absorbing liquor in circulation, and mingling said scrubbing-water with said liquor, thereby to recover the ammonia absorbed by the scrubbing-water.

2. The process or recovering ammonia from coal or fuel gases, which consists in subjecting the gas to an ammonia-absorbing liquor in circulation, thereafter passing the gas through or in contact with water in circulation to cool and wash the same, and mingling said water and liquor, whereby the ammonia in said water is recovered.

3. The process of recovering ammonia from coal and fuel gases, which consists in passing the gas through or in contact with water in circulation to scrub the same, then subjecting the gas to an ammonia-absorbing agent, again passing the gas through or in contact with water in circulation to cool the same, passing the excess of cooling-water to the scrubber, and subjecting the excess of water from the scrubber to the action of an ammonia-absorbing agent.

4. The process of recovering ammonia from coal or fuel gases, which consists in passing the gas through or in contact with water in circulation to scrub the same, then passing the same through or in contact with an ammonia-absorbing liquor, again passing the same through or in contact with water to cool the same, and causing a portion of water from the cooler to flow to the scrubber, and a portion of the water from the scrubber to flow to and be mingled with the ammonia-absorbing liquor.

5. The process of recovering ammonia from coal or fuel gas, which consists in passing the gas through or in contact with water to scrub the same, then passing the same through or in contact with an ammonia-absorbing liquor in circulation, again passing the same through or in contact with water in circulation to cool the same, thereby condensing the moisture contained in the gas, returning the excess of water from the cooler to the scrubber, and causing the excess of water from the scrubber to flow to and mingle with the ammonia-absorbing liquor.

6. The process of cleaning gas which consists in passing the gas through or in contact with water in circulation to scrub the same, then subjecting said gas to a cooling process and thereby condensing the moisture contained therein, and returning the water of condensation to the scrubber.

7. The process of cleaning gas, which consists in passing the gas through or in contact with water in circulation to scrub the same, and then through or in contact with water in circulation to cool the same, thereby condensing the moisture contained in the gas, and returning the excess of water from the cooler to the scrubber.

8. The process of recovering ammonia from coal or fuel gases, which consists in passing the gas through or in contact with water to scrub the same, and then through and in contact with water containing sulfuric acid to absorb the ammonia therefrom, and conducting the excess of the scrubbing-water to and mingling the same with the ammonia-absorbing water.

In testimony whereof I, the said EDWARD JAMES DUFF, have hereunto set my hand.

EDWARD JAMES DUFF.

Witnesses:
ROBERT C. TOTTEN,
J. R. KELLER.